United States Patent
Howard

(10) Patent No.: US 10,088,229 B2
(45) Date of Patent: *Oct. 2, 2018

(54) SYSTEM AND METHOD FOR CRYOGENIC PURIFICATION OF A FEED STREAM COMPRISING HYDROGEN, METHANE, NITROGEN AND ARGON

(71) Applicant: Henry E. Howard, Grand Island, NY (US)

(72) Inventor: Henry E. Howard, Grand Island, NY (US)

(73) Assignee: PRAXAIR TECHNOLOGY, INC., Danbury, CT (US)

(*) Notice: Subject to any disclaimer, the term of this patent is extended or adjusted under 35 U.S.C. 154(b) by 66 days.

This patent is subject to a terminal disclaimer.

(21) Appl. No.: 15/271,594

(22) Filed: Sep. 21, 2016

(65) Prior Publication Data

US 2018/0080710 A1 Mar. 22, 2018

(51) Int. Cl.
*F25J 3/02* (2006.01)
*F25J 5/00* (2006.01)
(Continued)

(52) U.S. Cl.
CPC ............ *F25J 3/0223* (2013.01); *C01B 3/506* (2013.01); *C01C 1/0405* (2013.01); *F25J 1/004* (2013.01);
(Continued)

(58) Field of Classification Search
CPC ........ F25J 3/0252; F25J 3/0219; F25J 3/0257; F25J 3/0285; F25J 3/0276; F25J 3/04587;
(Continued)

(56) References Cited

U.S. PATENT DOCUMENTS

| | | | |
|---|---|---|---|
| 2,990,690 A | 7/1961 | Martin | |
| 3,442,613 A * | 5/1969 | Grotz, Jr. | ............... C01B 3/025 252/374 |

(Continued)

FOREIGN PATENT DOCUMENTS

WO 92/12927 8/1992

OTHER PUBLICATIONS

Makund Bhakta, Bernard Grotz, Jim Gosnell, and S. Madhavan; "Techniques for Increasing Capacity and Efficiency of Ammonia Plants"; Ammonia Technical Manual 1998; pp. 185-196.
(Continued)

*Primary Examiner* — Brian King
(74) *Attorney, Agent, or Firm* — Robert J. Hampsch

(57) ABSTRACT

A system and method for cryogenic purification of a hydrogen, nitrogen, methane and argon containing feed stream to produce a methane free, hydrogen and nitrogen containing synthesis gas and a methane rich fuel gas, as well as to recover an argon product stream, excess hydrogen, and excess nitrogen is provided. The disclosed system and method are particularly useful as an integrated cryogenic purifier in an ammonia synthesis process in an ammonia plant. The excess nitrogen is a nitrogen stream substantially free of methane and hydrogen that can be used in other parts of the plant, recovered as a gaseous nitrogen product and/or liquefied to produce a liquid nitrogen product.

31 Claims, 5 Drawing Sheets

(51) Int. Cl.
  *C01B 3/50* (2006.01)
  *C01C 1/04* (2006.01)
  *F25J 1/00* (2006.01)
  *F25J 1/02* (2006.01)

(52) U.S. Cl.
  CPC .......... *F25J 1/0015* (2013.01); *F25J 1/0035* (2013.01); *F25J 1/0037* (2013.01); *F25J 1/0208* (2013.01); *F25J 1/0237* (2013.01); *F25J 1/0264* (2013.01); *F25J 1/0288* (2013.01); *F25J 3/0219* (2013.01); *F25J 3/0233* (2013.01); *F25J 3/0257* (2013.01); *F25J 3/0276* (2013.01); *F25J 3/0285* (2013.01); *F25J 5/005* (2013.01); *C01B 2203/046* (2013.01); *C01B 2203/068* (2013.01); *F25J 2200/30* (2013.01); *F25J 2200/70* (2013.01); *F25J 2200/72* (2013.01); *F25J 2200/74* (2013.01); *F25J 2200/94* (2013.01); *F25J 2200/96* (2013.01); *F25J 2205/02* (2013.01); *F25J 2205/30* (2013.01); *F25J 2205/60* (2013.01); *F25J 2210/04* (2013.01); *F25J 2210/20* (2013.01); *F25J 2210/42* (2013.01); *F25J 2210/58* (2013.01); *F25J 2210/62* (2013.01); *F25J 2215/04* (2013.01); *F25J 2215/20* (2013.01); *F25J 2215/42* (2013.01); *F25J 2215/58* (2013.01); *F25J 2215/60* (2013.01); *F25J 2220/02* (2013.01); *F25J 2230/08* (2013.01); *F25J 2230/30* (2013.01); *F25J 2235/60* (2013.01); *F25J 2240/12* (2013.01); *F25J 2240/40* (2013.01); *F25J 2245/02* (2013.01); *F25J 2260/20* (2013.01); *F25J 2270/02* (2013.01); *F25J 2270/06* (2013.01); *F25J 2270/12* (2013.01); *F25J 2270/16* (2013.01); *F25J 2270/42* (2013.01); *F25J 2270/90* (2013.01); *F25J 2270/904* (2013.01)

(58) Field of Classification Search
  CPC ........ F25J 3/0675; F25J 3/068; F25J 2210/20; F25J 2215/20; C01B 3/025; C01B 3/02; C01B 2203/04; C01B 2203/046
  See application file for complete search history.

(56) References Cited

U.S. PATENT DOCUMENTS

| | | | |
|---|---|---|---|
| 3,666,415 A | | 5/1972 | Harmens |
| 3,675,434 A | * | 7/1972 | Crawford ............... C01B 3/506 |
| | | | 62/630 |
| 4,058,589 A | | 11/1977 | Haslam |
| 4,077,780 A | | 3/1978 | Doshi |
| 4,357,153 A | | 11/1982 | Erickson |
| 4,524,056 A | | 6/1985 | Banquy |
| 4,549,890 A | | 10/1985 | Bligh |
| 4,752,311 A | | 6/1988 | MacLean et al. |
| 4,805,414 A | | 2/1989 | Fisher |
| 5,775,128 A | * | 7/1998 | Drnevich ............... C01B 3/025 |
| | | | 62/632 |
| 5,935,544 A | | 8/1999 | Bhakta |
| 6,620,399 B1 | | 9/2003 | Jungerhans |
| 7,090,816 B2 | | 8/2006 | Malhotra et al. |
| 8,307,671 B2 | * | 11/2012 | Jungerhans ........... F25J 3/0219 |
| | | | 423/359 |
| 2008/0170980 A1 | | 7/2008 | Reddy et al. |
| 2013/0039835 A1 | | 2/2013 | Ostuni et al. |
| 2016/0060130 A1 | | 3/2016 | Ostuni et al. |

OTHER PUBLICATIONS

W. H. Isalski; "Separation of Gases"; Clarendon Press—Oxford 1989; pp. 84-88.

* cited by examiner

SYSTEM AND METHOD FOR CRYOGENIC PURIFICATION OF A FEED STREAM COMPRISING HYDROGEN, METHANE, NITROGEN AND ARGON

TECHNICAL FIELD

The present invention relates to an integrated cryogenic purification system and method for chemical plants, such as an ammonia plant. More particularly the present invention relates to a system and method for cryogenic purification and recovery of argon, hydrogen, and nitrogen from a crude synthesis gas feed stream comprising hydrogen, nitrogen, methane and argon to recover argon, as well as excess hydrogen and nitrogen.

BACKGROUND

The availability of low cost natural gas has led to the restart and construction of numerous ammonia production facilities throughout North America. Ammonia is typically produced through steam methane reforming. In the steam methane reforming process, air is used to auto-fire the reaction and to supply nitrogen for the ammonia synthesis reaction. In general, the steam methane reforming based process consists of primary steam reforming, secondary 'auto-thermal' steam reforming followed by a water-gas shift reaction and carbon oxide removal processes to produce a synthesis gas. The synthesis gas is subsequently dried to produce a raw nitrogen-hydrogen process gas with small amounts of methane and inerts which is then fed to an ammonia synthesis reaction. In many ammonia production plants, the raw nitrogen-hydrogen process gas is often subjected to a number of purification or additional process steps prior to the ammonia synthesis reaction.

A commercially important part of the ammonia processing train often used in ammonia plants is a cryogenic purification process known by those skilled in the art as the 'Braun Purifier'. Since the secondary reformer is fed with an air flow having a nitrogen content that is larger than that required by the stoichiometry of the ammonia synthesis reaction, excess nitrogen, unconverted methane and inert gases must be removed or rejected from the raw nitrogen-hydrogen process gas prior to the ammonia synthesis step. In order to reject the excess nitrogen, unconverted methane and inerts, the Braun-type cryogenic purification process is introduced after the methanation reaction. The primary purpose of this Braun-type cryogenic purification process is to generate an overhead ammonia synthesis gas stream with a stoichiometric ratio of hydrogen to nitrogen (H2:N2) of about 3:1 and low levels of methane and inerts.

The cryogenic purification step of the Braun Purifier typically employs a single stage of refrigerated rectification. The overhead synthesis gas stream from the single stage of refrigerated rectification is substantially free of unconverted methane and a substantial portion of the inerts, such as argon, are rejected into the fuel gas stream-bottoms liquid. In the Braun Purifier process, the feed gas stream is first cooled and dehydrated. The feed gas stream is then partially cooled and expanded to a lower pressure. The feed gas stream may be further cooled to near saturation and partially condensed and then directed to the base of the single stage rectifier. The rectifier overhead is the resulting ammonia synthesis gas that is processed for ammonia synthesis, whereas the rectifier bottoms are partially vaporized by passage through the rectifier condenser and warmed to ambient temperatures. This fuel/waste stream is typically directed back to the reformer and serves as fuel. See Bhakta, M., Grotz, B., Gosnell, J., Madhavan, S., "Techniques for Increase Capacity and Efficiency of Ammonia Plants", Ammonia Technical Manual 1998, which provides additional details of this Braun Purifier process.

The waste gas from the Braun Purifier process step is predominantly a mixture of hydrogen (6.3 mole %), nitrogen (76.3 mole %), methane (15.1 mole %) and argon (2.3 mole %). The conventional argon recovery processes from ammonia tail gas are typically integrated with the hydrogen recovery process downstream of the Braun purifier. The conventional argon recovery processes are relatively complex and involves multiple columns, vaporizers, compressors, and heat exchangers, as described for example in W. H Isalski, "*Separation of Gases*" (1989) pages 84-88. Other relatively complex argon recovery systems and process are disclosed in U.S. Pat. Nos. 3,442,613; 5,775,128; 6,620,399; 7,090,816; and 8,307,671. Similarly, systems and processes for the recovery of argon, hydrogen and nitrogen from the waste gas are disclosed in U.S. Pat. Nos. 3,666,415; 3,675, 434; 4,058,589; 4,077,780; 4,524,056; 4,752,311 and United. States Patent Application Publication No. 2013/0039835; and 2016/0060130. While these waste gas processing solutions adequately recover the argon, hydrogen and nitrogen, they do so at additional capital and operating costs.

What is needed therefore is an efficient and cost effective solution for recovery of the hydrogen, methane, nitrogen, and argon that is preferably integrated with the cryogenic purification of the synthesis gas.

SUMMARY OF THE INVENTION

The present invention may be characterized as a cryogenic purification system configured for purifying a hydrogen, nitrogen, methane and argon containing feed stream, the purification system comprising: (i) a synthesis gas rectification column configured to receive the feed stream and produce a hydrogen and nitrogen enriched overhead vapor stream and a methane-rich condensed phase stream proximate the bottom of the synthesis gas rectification column; (ii) a hydrogen stripping column configured to receive the methane-rich condensed phase stream from the synthesis gas rectification column, strip hydrogen from the methane-rich condensed phase stream and produce a hydrogen free methane bottom stream and a hydrogen enriched gaseous overhead; (iii) a condenser configured to receive the hydrogen free methane bottom stream and a working fluid and to produce a vaporized or partially vaporized hydrogen free methane-rich stream; and (iv) a heat exchanger configured to (a) warm the hydrogen and nitrogen enriched overhead vapor stream via indirect heat exchange with the feed stream to produce a hydrogen and nitrogen containing synthesis gas; and (b) to warm the vaporized or partially vaporized hydrogen free methane-rich stream via indirect heat exchange with the feed stream to produce a methane fuel gas.

The present invention may be characterized as a cryogenic purification system configured for purifying a hydrogen, nitrogen, methane and argon containing feed stream, the cryogenic purification system comprising: (i) a synthesis gas rectification column configured to receive the hydrogen, nitrogen, methane and argon containing feed stream and produce a hydrogen and nitrogen enriched overhead vapor stream and a methane-rich condensed phase stream proximate the bottom of the synthesis gas rectification column; (ii) a condenser-reboiler disposed within the synthesis gas rectification column configured to vaporize the hydrogen free methane bottom stream against a working fluid to produce a vaporized or partially vaporized hydrogen free methane rich stream; (iii) a nitrogen rectification column configured to receive the vaporized or partially vaporized hydrogen free methane bottom stream and a liquid nitrogen reflux stream and produce a nitrogen containing overhead vapor stream substantially free of methane, and a methane enriched liquid bottom stream; (iv) a heat exchanger configured to (a) warm the hydrogen and nitrogen enriched overhead vapor stream via indirect heat exchange with the hydrogen, nitrogen, methane and argon containing feed stream to produce a hydrogen and nitrogen containing synthesis gas; (b) to warm the nitrogen containing overhead vapor stream substantially free of methane to produce a warm gaseous nitrogen stream, and (c) to warm the methane enriched liquid bottom stream to produce a methane fuel gas; and (v) a nitrogen recovery system configured to receive the warm nitrogen containing stream and produce at least one nitrogen product.

In some of the preferred embodiments, the feed gas may be conditioned via pre-purification of the feed stream, further compression or expansion of the feed stream to a pressure that is preferably greater than or equal to about 300 psia, and/or cooling of the feed stream to a temperature near saturation, and warming of the feed stream. The pre-purification of the feed stream may involve removing selected impurities or contaminants from the crude feed stream in an adsorption based pre-purifier or getter.

In embodiments that include hydrogen recovery, the present systems may further include a second heat exchanger configured for cooling the methane-rich condensed phase stream to produce a cooled methane-rich stream; and an expansion valve disposed downstream of the second heat exchanger and upstream of the hydrogen stripping column and configured to expand the cooled methane-rich stream to a pressure less than or equal to about 100 psia. Such embodiments may also include a recycle circuit configured to recycle the hydrogen rich gaseous overhead from the hydrogen stripping column back to the hydrogen, nitrogen, methane and argon containing feed stream or the conditioned feed stream. A hydrogen compressor may be disposed within the recycle circuit upstream of the feed stream and configured to compress the hydrogen rich gaseous overhead stream to a pressure greater than or equal to the pressure of the hydrogen, nitrogen, methane and argon containing feed stream or the conditioned feed stream. In such embodiments, the hydrogen enriched gaseous overhead from the hydrogen stripping column is preferably warmed in the heat exchanger via indirect heat exchange with the hydrogen, nitrogen, methane and argon containing feed stream.

In embodiments that include nitrogen recovery, the present systems include a nitrogen rectification column configured to receive the vaporized or partially vaporized hydrogen free methane-rich stream and a nitrogen reflux stream and produce a nitrogen containing overhead vapor stream substantially free of methane and hydrogen, and a methane enriched liquid bottom stream. The resulting methane enriched liquid bottom stream is preferably warmed in the heat exchanger via indirect heat exchange with the feed stream to produce the methane fuel gas while the nitrogen containing overhead vapor stream substantially free of methane and hydrogen is also warmed in the heat exchanger via indirect heat exchange with the feed stream to produce a warm nitrogen stream. The warmed nitrogen stream is then directed to a nitrogen recovery system, such as a liquefier, or purification system configured to produce at least one nitrogen product, preferably a liquid nitrogen stream or a purified gaseous nitrogen stream.

In embodiments that include argon recovery, the present systems further comprises an argon rectification column configured to receive an argon enriched stream substantially free of methane from an intermediate location of the nitrogen rectification column and produce an argon bottoms liquid stream and a nitrogen enriched overhead stream. The nitrogen enriched overhead stream is then returned to the nitrogen rectification column while the argon bottoms liquid stream is extracted from the argon rectification column as a crude argon product stream.

BRIEF DESCRIPTION OF THE DRAWINGS

While the specification concludes with claims specifically pointing out the subject matter that Applicant regards as the invention, it is believed that the invention will be better understood when taken in connection with the accompanying drawings in which;

For sake of clarity, many of the reference numerals used in FIGS. 1-5 are similar in nature such that the same reference numeral in one figure corresponds to the same item, element or stream as in the other figures.

DETAILED DESCRIPTION

The following detailed description provides one or more illustrative embodiments and associated methods for cryogenic purification of a feed stream comprising hydrogen, nitrogen, methane and argon into its major constituents. The various embodiments include: (i) a cryogenic purifier system with stripping of excess hydrogen and recycling of the stripped hydrogen to the feed stream so as to increase the synthesis gas production; (ii) a cryogenic purifier system with enhanced recovery of nitrogen; (iii) a cryogenic purifier system with enhanced recovery of nitrogen and argon; and (iv) a cryogenic purifier system with an integrated nitrogen liquefier. Each of these embodiments will be described in the paragraphs that follow.

Cryogenic Purifier with Recycled Hydrogen Stream

Figure 1:
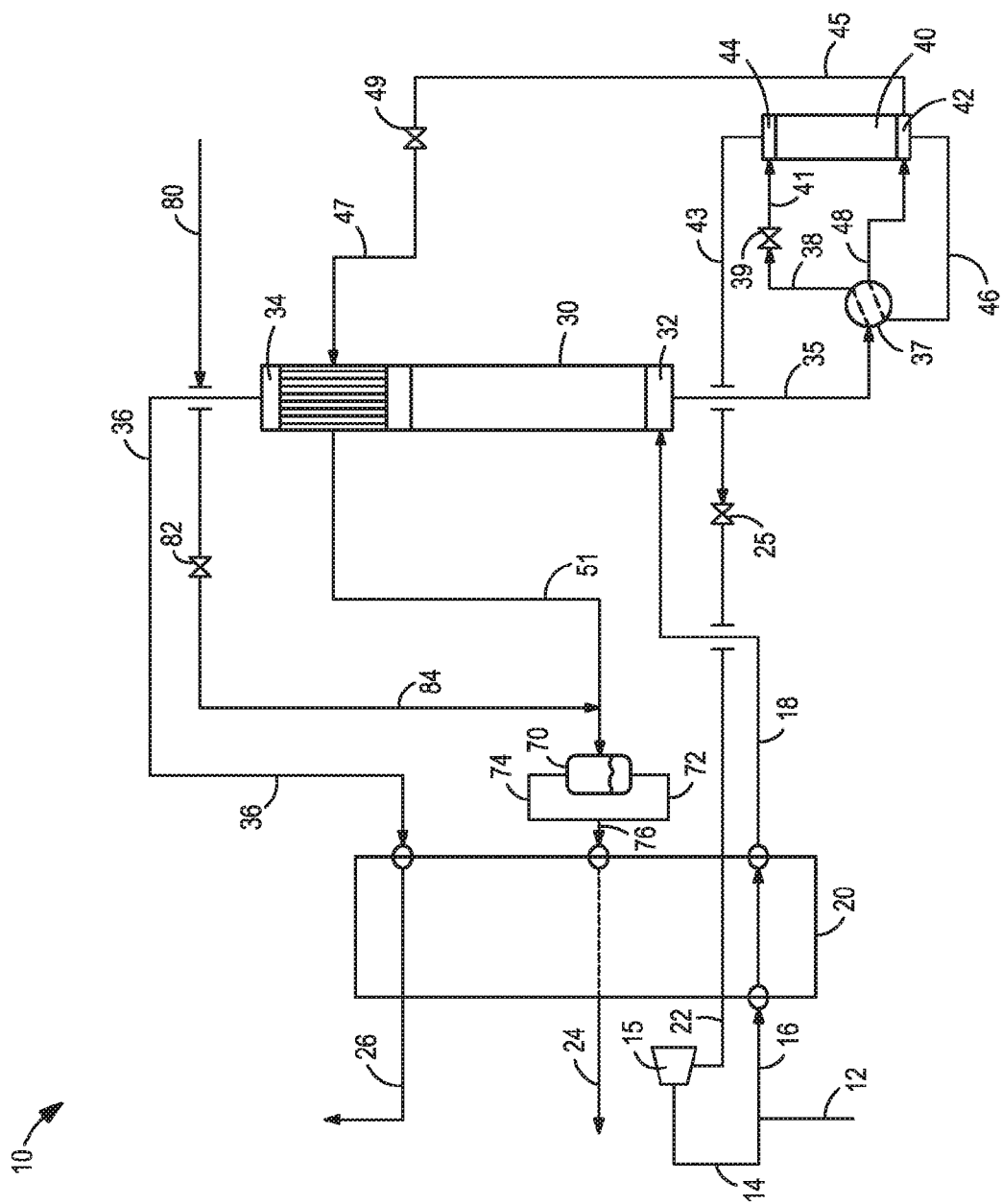
FIG. 1 is a schematic representation of an embodiment of a cryogenic purifier system and method in accordance with one aspect of the present invention.

Turning now to FIG. 1, a schematic representation of an integrated cryogenic purification system 10 is shown. As seen therein, a pre-purified feed stream 12 comprising hydrogen, nitrogen, methane and argon at a pressure greater than about 300 psia is cooled to a temperature near saturation in a primary heat exchanger 20. The resulting conditioned feed stream 18 is directed to a synthesis gas rectification column 30 that is configured to produce a hydrogen and nitrogen enriched overhead vapor stream 34 and a methane-rich condensed phase stream 32 proximate the bottom of the synthesis gas rectification column 30. In ammonia plant applications that employ the cryogenic purification system, the hydrogen and nitrogen enriched overhead vapor stream 34 would preferably have a hydrogen to nitrogen ratio of about 3:1. Also, as discussed in more detail below, the pre-purified feed stream 12 may be combined with a compressed hydrogen recycle stream 14 upstream of the heat exchanger 20 and the resulting high pressure mixed feed stream 16 comprising hydrogen, nitrogen, methane and argon is cooled to near saturation.

The conditioning of the feed streams may further include additional compression, expansion, cooling, condensing and/or vaporizing steps depending upon the source of the feed streams. Likewise, pre-purification of the feed streams preferably includes removing selected contaminants from the feed stream in an adsorption based pre-purifier (not shown). For example, in some applications residual carbon oxide impurities at levels less than about 10.0 ppm or other unwanted impurities and low boiling contaminants may accompany the crude feed stream. In such circumstances, adsorbents, getters or other purification systems (not shown) can be employed to further remove such impurities and low boiling contaminants from the crude feed streams, which could be, for example, a crude synthesis gas from an ammonia plant. Such pre-purification may be conducted while a portion of the crude feed stream is in the liquid phase or predominately gas phase and either upstream, downstream or in conjunction with the conditioning of the feed streams.

A portion of the methane rich condensed phase stream 32 from the bottom of the synthesis gas rectification column 30 is then extracted as stream 35 and directed to a hydrogen stripping column 40 configured to strip hydrogen from the methane rich condensed phase stream 35 and produce a hydrogen free methane bottom stream 42 and a hydrogen enriched gaseous overhead 44.

In the illustrated embodiment, the portion of the methane rich condensed phase stream 35 is first subcooled in subcooler 37 via indirect heat exchange with a diverted first portion 46 of the hydrogen free methane bottom stream 42. The subcooled methane rich stream 38 is expanded or flashed to a lower pressure by expansion valve 39 to a pressure less than or equal to about 100 psia with the lower pressure methane rich stream 41 introduced proximate the top of the hydrogen stripping column 40. The warmed first portion 48 of the of the hydrogen free methane bottom stream is then reintroduced into the hydrogen stripping column 40.

A second portion 45 of the hydrogen free methane bottom stream 42 is extracted from the hydrogen stripping column 40, expanded in valve 49 and directed as stream 47 to a condenser-reboiler disposed within the synthesis gas rectification column 30 where it is vaporized against a working fluid such as a nitrogen rich liquid to produce a vaporized or partially vaporized hydrogen free methane-rich stream 51. While the present Figures illustrate the vaporization of the hydrogen-free methane bottom stream occurring in a condenser-reboiler disposed within the synthesis gas rectification column, it is also contemplated to employ a separate, stand-alone vaporizer or perhaps integrate the vaporization step within other heat exchangers within the cryogenic purification system 10. In the embodiment of FIG. 1, the partially vaporized hydrogen free methane-rich stream 51 is directed to phase separator 70 where it is separated into a vapor phase stream 74 and a liquid phase stream 72 to facilitate feed distribution into the heat exchanger, as optimal distribution of a two phase stream directly into the heat exchanger is difficult and often leads to poor heat exchanger performance. The vapor phase stream 74 and liquid phase stream 72 (collectively stream 76) are then directed to heat exchanger 20 where the stream(s) are further warmed via indirect heat exchange with the mixed feed stream 16 to produce a methane containing fuel gas stream 24.

The hydrogen enriched gaseous overhead 44 from the hydrogen stripping column 40 is recycled as stream 43 via valve 25 and warmed in the heat exchanger 20. The warmed hydrogen recycle stream 22 is preferably recompressed in compressor 15 and the compressed recycle stream 14 is combined with the pre-purified feed stream 12. Alternatively, the hydrogen recycle stream may be cooled separately and introduced as a separate stream into the base of the synthesis gas rectification column 30. Further alternatives contemplate combining the hydrogen enriched gaseous overhead 44 from the hydrogen stripping column 40 with other fuel gas streams such as the partially vaporized hydrogen free methane-rich stream 51 and further processed as described above to produce the warmed fuel gas stream 24.

The hydrogen and nitrogen enriched overhead vapor stream 34 is taken from the synthesis gas rectification column 30 as a stream 36 and directed to heat exchanger 20 where it is warmed via indirect heat exchange with the mixed feed stream 16 to produce the hydrogen and nitrogen containing synthesis gas stream 26. As indicated above, in applications involving ammonia synthesis, the hydrogen to nitrogen ratio in the hydrogen and nitrogen enrich overhead vapor stream and the hydrogen and nitrogen containing synthesis gas stream is preferably about 3:1.

For purposes of adding refrigeration to the cryogenic purification process, a cryogenic refrigeration stream 80 may be introduced into the process. The cryogenic stream 80 is preferably comprised of liquid nitrogen, but may also contain or comprise other cryogen refrigerants (e.g. $CH_4$, Ar, etc.). In lieu of the supplemental refrigeration stream, it is possible to produce the supplemental refrigeration using a turbine, however such optional use of a separate turbine to produce the required refrigeration requires additional capital costs.

Cryogenic Purifier with Enhanced Nitrogen Recovery

Figure 2:
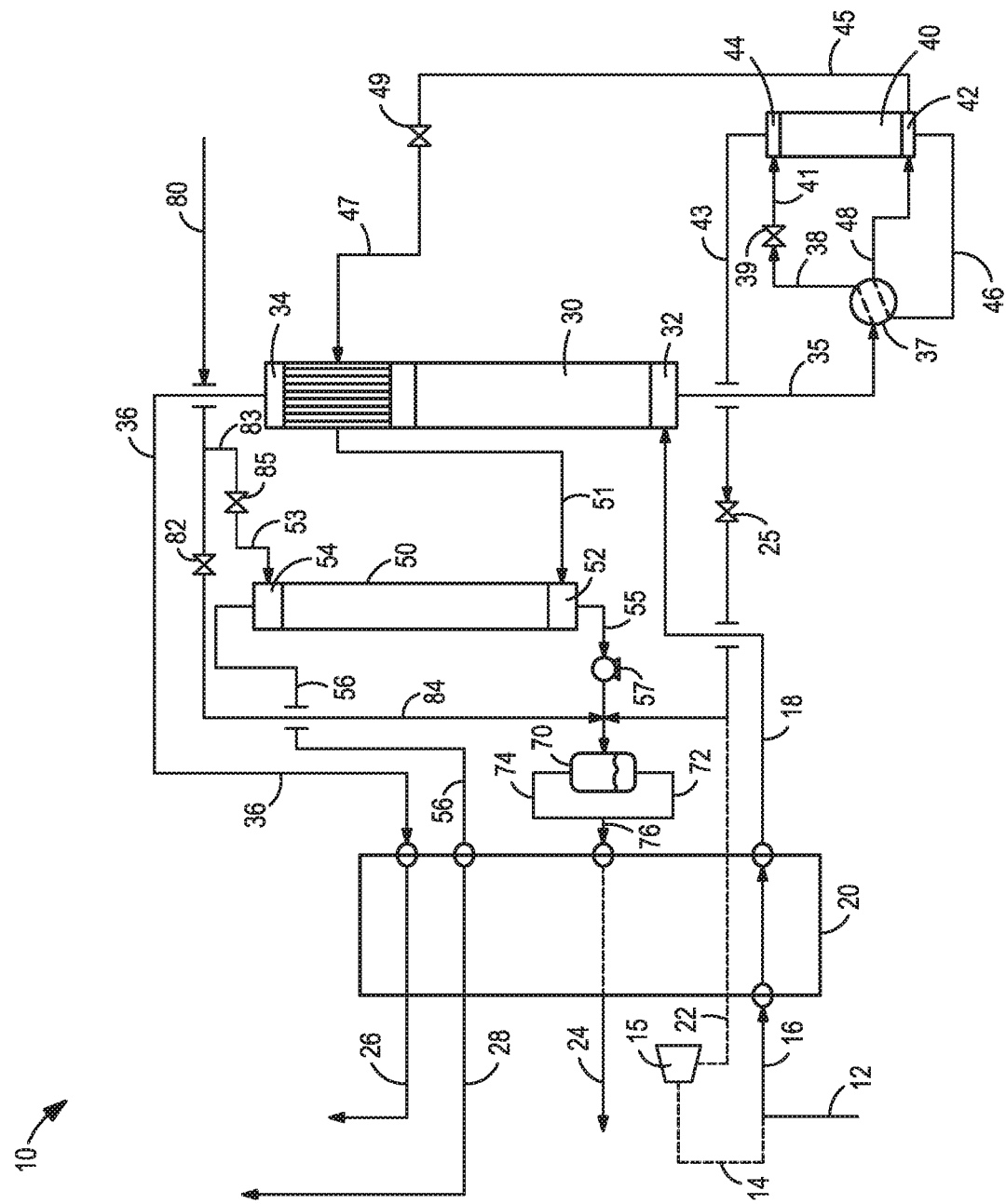
FIG. 2 is a schematic representation of another embodiment of a cryogenic purifier system and method with enhanced nitrogen recovery in accordance with another aspect of the present invention.
Figure 3:
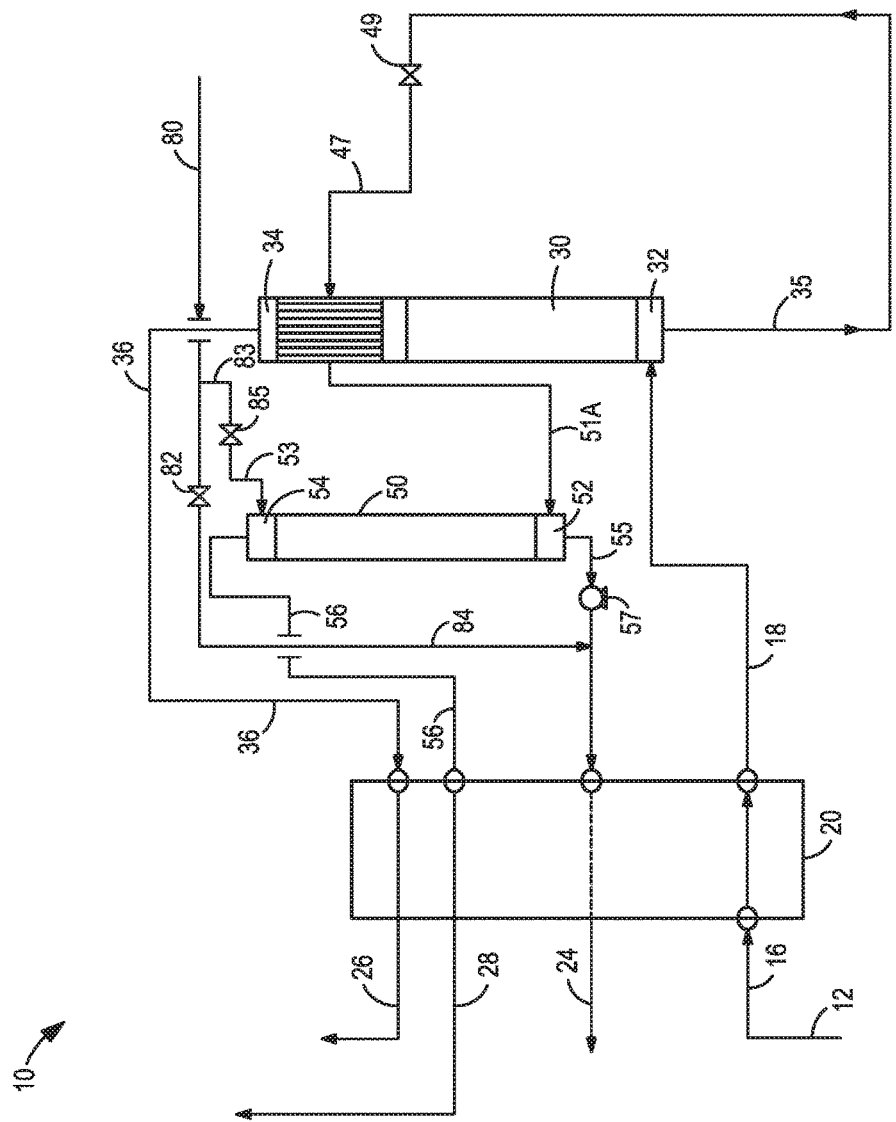
FIG. 3 is a schematic representation of another embodiment of a cryogenic purifier system and method with enhanced nitrogen recovery.

Turning now to FIGS. 2 and 3, there is shown embodiments of a cryogenic purifier system and method with enhanced recovery of nitrogen both with upstream hydrogen stripping (FIG. 2) and without upstream hydrogen stripping (FIG. 3).

The integrated cryogenic purification systems 10 shown in FIG. 2 and FIG. 3 include the pre-purified feed stream 12, compressed hydrogen recycle stream 14, high pressure mixed feed stream 16, conditioned feed stream 18, synthesis gas rectification column 30, hydrogen and nitrogen enriched overhead vapor stream 34, methane-rich condensed phase stream 32 as generally shown and described with reference to FIG. 1, and for sake of brevity will not be repeated here. Also, like the embodiment of FIG. 1, the hydrogen and nitrogen enriched overhead vapor stream 34 of FIGS. 2 and 3 are also taken from the synthesis gas rectification column 30 as stream 36 and directed to heat exchanger 20 where it is warmed via indirect heat exchange with the mixed feed stream 16 to produce the hydrogen and nitrogen containing synthesis gas stream 26. Preferably, the hydrogen to nitrogen ratio in the hydrogen and nitrogen enrich overhead vapor stream and the hydrogen and nitrogen containing synthesis gas stream is about 3:1.

In addition, the embodiment shown in FIG. 2 also includes the methane rich stream 35, the hydrogen stripping column 40, the hydrogen free methane bottom stream 42, the hydrogen enriched gaseous overhead 44, the subcooler 37, the subcooled methane rich stream 38, the expanded methane rich stream 41 as well as the diverted first portion 46 of the hydrogen free methane stream 42 and subsequently warmed first portion 48 of the of the hydrogen free methane stream that are extracted from and reintroduced into the hydrogen stripping column 40, respectively. These elements and features of the illustrated embodiment are similar to or identical to the corresponding features shown and described with reference to the embodiment of FIG. 1.

In the embodiment of FIG. 2, the hydrogen enriched gaseous overhead 44 from the hydrogen stripping column 40 is preferably recycled as stream 43 via valve 25 and warmed in the heat exchanger 20. The warmed hydrogen recycle stream 22 is then recompressed in compressor 15 and the compressed recycle stream 14 is combined with the pre-purified feed stream 12 in a manner similar to that described above with reference to FIG. 1. Alternatively, the hydrogen enriched gaseous overhead 44 from the hydrogen stripping column 40 may be combined with other fuel gas streams and further processed as described above to produce the warmed fuel gas stream 24.

The main difference between the embodiment shown in FIG. 1 and the embodiment shown in FIG. 2 relates to the enhanced recovery of nitrogen. As taught above with reference to FIG. 1, a second portion 45 of the hydrogen free methane bottom stream 42 is extracted and directed via valve 49 as stream 47 to a condenser-reboiler disposed within the synthesis gas rectification column 30 where it is partially vaporized against the synthesis gas rectification column overhead to produce a partially vaporized hydrogen free methane-rich stream 51.

In the embodiment of FIG. 2, this partially vaporized hydrogen free methane-rich stream 51, is directed to a nitrogen rectification column 50 configured to produce a nitrogen containing overhead vapor stream 54 substantially free of methane and hydrogen, and a methane enriched liquid bottom stream 52. To facilitate the rectification within the nitrogen rectification column 50, a liquid nitrogen reflux stream 53 is also introduced to the nitrogen rectification column 50. The liquid nitrogen stream 80 preferably comes from an integrated nitrogen liquefier (See FIG. 5) where a diverted portion 83 of the liquid nitrogen stream 80 is introduced via valve 85 as liquid nitrogen reflux stream 53 to the upper portion of the nitrogen rectification column 50. Alternatively, the liquid nitrogen stream 80 may be derived from a remote liquid nitrogen source such as a remote liquid storage tank or reservoir (not shown).

A key aspect or feature of the present embodiment that enables a large fraction of the nitrogen to be recovered is the use of a mechanical liquid pump for the re-pressurization of the methane enriched liquid bottoms taken from the nitrogen rectifier. The nitrogen rectification column preferably operates at a pressure below the fuel gas header pressure, for example, at a pressure of less than or equal to about 50 psia, and more preferably at a pressure of less than or equal to about 25 psia. Alternatively, the use of a compressor to re-compresses the warmed (i.e. vaporized) methane back to the pressure of the fuel gas header may be used in lieu of the mechanical liquid pump.

The nitrogen containing overhead vapor stream 56 is warmed in heat exchanger 20 and the warmed nitrogen containing vapor stream 28 is directed to a nitrogen recovery system (not shown in FIGS. 2 and 3) to produce at least one nitrogen product, such as a gaseous nitrogen product and/or a liquid nitrogen product. A portion of the methane rich liquid bottom stream 52 is extracted from the nitrogen rectification column 50 as a methane rich stream 55 which is pumped to an appropriate pressure and warmed in the heat exchanger 20 to produce the methane fuel gas 24. Preferably, the pumped methane rich stream 55 together with the optional hydrogen vapor stream 43 (shown in FIG. 2) and any supplemental refrigeration stream 80 is directed to the phase separator 70 where it is separated into a vapor phase stream 74 and a liquid phase stream 72 (collectively stream 76) and directed to heat exchanger 20 where it is warmed via indirect heat exchange with the mixed feed stream 16 to produce the methane containing fuel gas 24. The phase separator 70 (shown in FIG. 2) is an optional item in that it may not be needed in embodiments of the present system that only direct methane liquid and/or liquid nitrogen to the heat exchanger (See FIG. 3). The main difference between the embodiment shown in FIG. 2 and the embodiment shown in FIG. 3 relates to the hydrogen stripping column and the hydrogen recycling circuit. In the embodiment of FIG. 3, the hydrogen stripping column and hydrogen recycling circuit are absent such that the hydrogen containing, methane rich stream 35 extracted from the synthesis gas rectification column 30 is directed via valve 49 as stream 47 to a condenser-reboiler disposed within the synthesis gas rectification column 30 where it is partially vaporized. This partially vaporized hydrogen and nitrogen containing methane-rich stream 51A is directed to a nitrogen rectification column 50 along with a liquid nitrogen reflux stream 53 where it is separated to produce a nitrogen and hydrogen containing overhead vapor stream 54 substantially free of methane, and a methane enriched liquid bottom stream 52.

The nitrogen and hydrogen containing overhead vapor stream 56 is warmed in heat exchanger 20 and directed to a nitrogen and hydrogen recovery system (not shown) to either separate the nitrogen and hydrogen as separate products or to reintroduce the $N_2$—$H_2$ mixture into the $NH_3$ synthesis train. Similar to the embodiment of FIG. 2, a portion of the methane rich liquid bottom stream 52 is extracted from the nitrogen rectification column 50 as a methane rich stream 55 typically at a pressure of between about 15 psia and 25 psia which is pumped to an appropriate pressure of preferably between about 30 psia to 40 psia or higher pressures, and subsequently warmed in the heat exchanger 20 to produce the methane fuel gas 24.

Cryogenic Purifier with Enhanced Nitrogen and Argon Recovery

Figure 4:
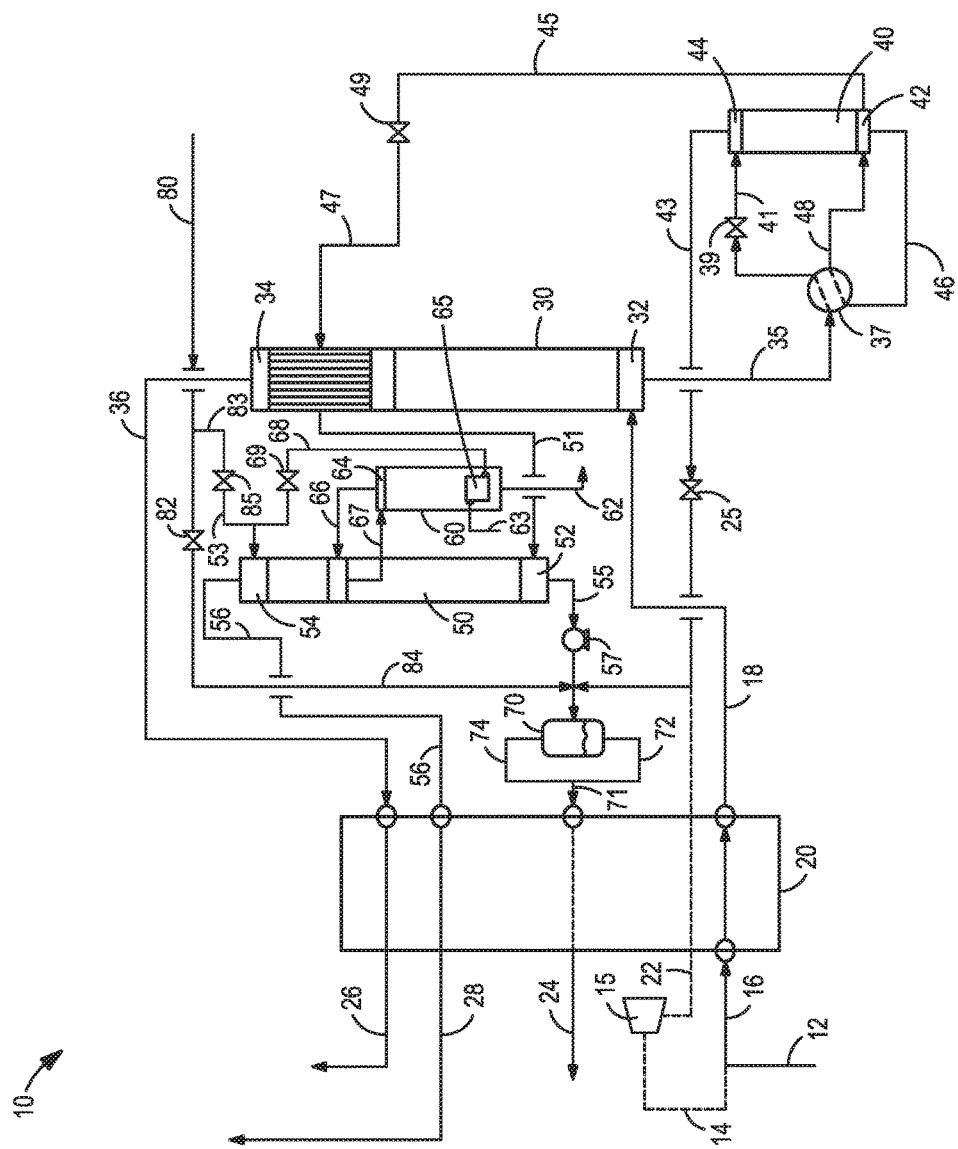
FIG. 4 is a schematic representation of yet another embodiment of a cryogenic purifier system and method with enhanced nitrogen and argon recovery in accordance with another aspect of the present invention.

Turning now to FIG. 4, there is shown another embodiment of a cryogenic purifier system and method similar to that shown in FIG. 2 but with enhanced recovery of both nitrogen and argon.

In many regards, the embodiment shown in FIG. 4 is very similar to the embodiment shown in FIG. 2, described above. The key difference between the embodiment shown in FIG. 4 and the embodiment shown in FIG. 2 relates to the enhanced recovery of argon using an argon rectification column 60 operatively coupled to the nitrogen rectification column 50. Preferably, an argon enriched stream 67 is extracted from an intermediate location of the nitrogen rectification column 50 and preferably at a location that is substantially free of methane, for example at a location where the methane concentration is less than about 1.0 part per million (ppm) and more preferably less than about 0.1 ppm. The extracted argon enriched stream 67 may be a liquid stream, a gaseous stream, or a two phase stream comprising a fraction of liquid argon and a fraction of gaseous argon.

The extracted argon enriched stream 67 is directed to an argon rectification column 60 preferably operating at a pressure of between about 65 psia and 80 psia and configured to separate the argon enriched stream and produce an argon bottoms liquid stream 62 and a nitrogen enriched overhead stream 66. The nitrogen enriched overhead stream 66 is subsequently returned to the nitrogen rectification column 50 at a location preferably above the intermediate location where the argon enriched stream 67 is extracted. The argon rectification column 60 further includes a condenser-reboiler 65 configured to reboil argon rectification column 60. A portion of the descending argon liquid within the column 60 is vaporized in condenser-reboiler 65 against a stream of condensing gaseous nitrogen the resulting liquid nitrogen stream 68 may then be directed to the top of column 50. Although pressurized nitrogen, such as a compressed portion of nitrogen stream 56 after warming, is the preferred fluid to supply the reboil duty for argon rectification column 60 other fluids could also be employed. The resulting argon bottoms liquid stream 62 from argon rectification column 60 is removed and could be taken directly as a crude argon merchant product or transported to a separate or an offsite argon refinement process, where it could later be further purified into suitable high purity argon product.

The liquid nitrogen stream 68 is preferably combined with liquid reflux stream 83. A first diverted portion of the liquid nitrogen stream 80 is a nitrogen reflux stream 53 introduced into the nitrogen rectification column 50. Reflux for column 50 may also be supplemented with the condensed nitrogen derived from condenser-reboiler 65. A second diverted portion of the liquid nitrogen stream 80 can optionally be diverted as stream 84 and used to supplement the refrigeration of the present purification process independent of the operation of the rectification column 50.

While the preferred embodiment of the cryogenic purification system and process with nitrogen and argon recovery is described with reference to FIG. 4, alternative embodiments are contemplated where the upper portion of nitrogen rectification column may be configured atop the argon rectification column. In this alternate configuration, the bottom half of the nitrogen column might be a separate column or may even be configured as a divided wall column.

Cryogenic Purifier with an Integrated Nitrogen Liquefier

Figure 5:
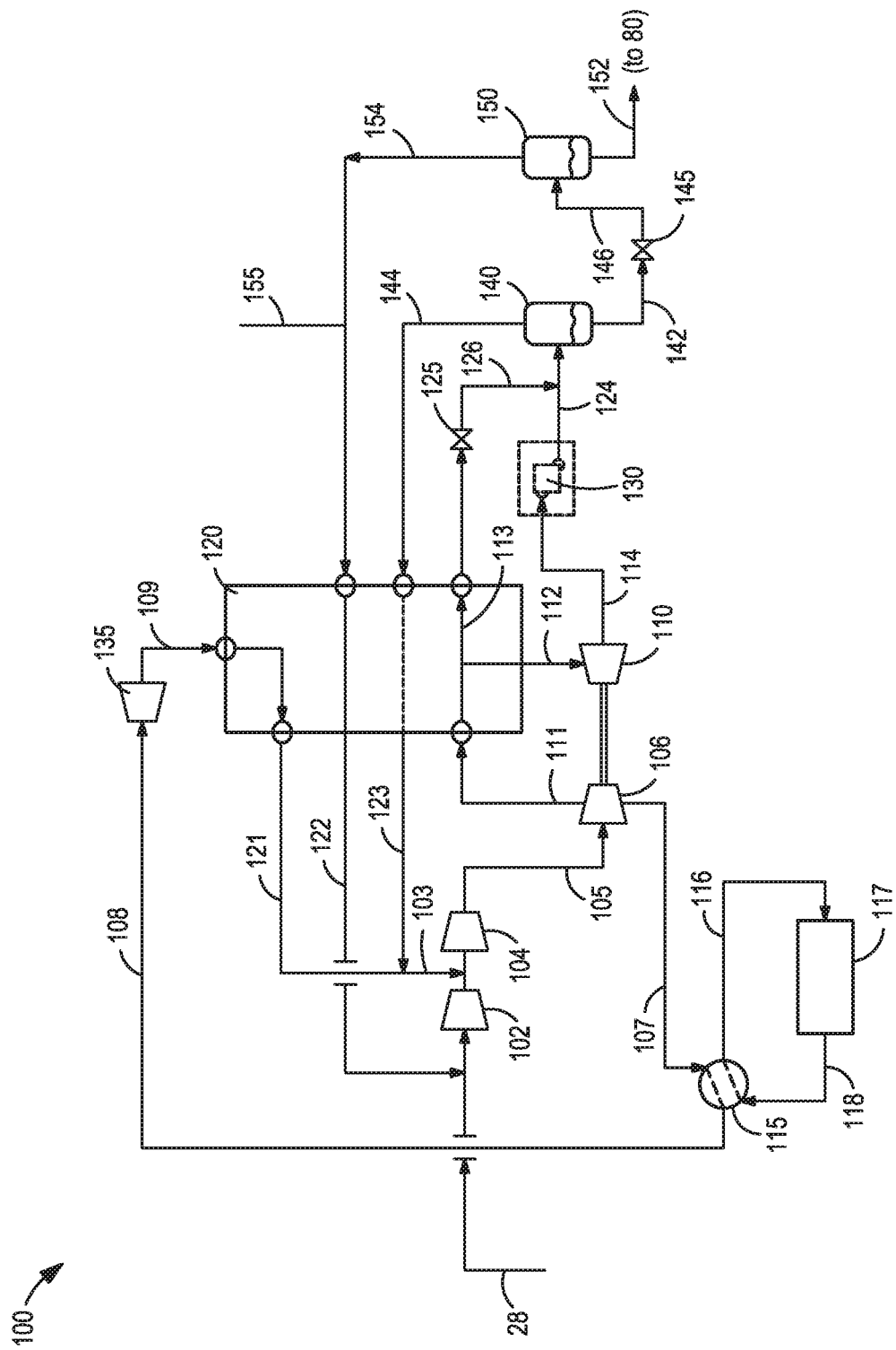
FIG. 5 is a schematic representation of an integrated nitrogen liquefier suitable for use with the embodiments of the integrated cryogenic purifier systems and methods depicted in FIGS. 1 through 4.

Turning now to FIG. 5, there is shown an integrated nitrogen liquefier arrangement 100 suitable for use in the cryogenic purifier systems 10 of FIGS. 1-4. As seen therein, the incoming stream 28 is preferably the warmed nitrogen containing vapor stream received from the above-described cryogenic purifier system 10 and compressed in a multi-stage compressor arrangement (shown in FIG. 5 as compressor stages 102, 104). The compressed nitrogen stream 105 is optionally further compressed in a turbine loaded booster compressor 106.

A first portion 107 of the further compressed nitrogen vapor stream is diverted from the booster compressor 106 to a refrigeration circuit where the first portion 107 is cooled via indirect heat exchange in economizer 115 with a refrigerant stream 118. The warmed refrigerant stream 116 is routed back to a chiller 117 where it is cooled and recycled back to the economizer 115 in a generally closed loop fashion. The diverted and cooled first portion 108 of the further compressed nitrogen stream is then expanded in turboexpander 130 with the resultant exhaust stream 109 directed to the heat exchanger 120 to supply supplemental refrigeration to the integrated nitrogen liquefier arrangement and subsequently returned as warmed exhaust stream 121 to an intermediate stage of the multi-stage compressor arrangement 102/104, as preferably shown in FIG. 5.

A second portion 111 of the further compressed nitrogen stream is directed to the heat exchanger 120. Part of the second portion 111 of the further compressed nitrogen stream is only partially cooled in the heat exchanger 120 and diverted as stream 112 to the turbine 110 that drives the turbine loaded booster compressor. The remaining part of the second portion 111 of the further compressed nitrogen stream is fully cooled in the heat exchanger 120, valve expanded in expansion valve 125 to form a second liquid or partially liquid nitrogen stream 126.

The resulting expanded nitrogen stream 114 is optionally directed to a condenser-reboiler 130 to condense or partially condense nitrogen stream 114 to form a first liquid or partially liquid nitrogen stream 124. The objective of the condenser-reboiler 130 is optionally supply the reboil stream necessary to operate argon stripping column 60 (See FIG. 4). In this regard, condenser-reboiler 130 is the same as reboiler 65 of FIG. 4. Alternatively, the reboil stream can be extracted from feed gas compressor 102 and directed in a separate pass into the reboiler 65 of FIG. 4.

The liquid or partially liquid nitrogen streams 124, 126 are preferably mixed and directed as a combined stream to a first phase separator 140 configured to produce a liquid nitrogen stream 142 and a cold gaseous nitrogen stream 144. The cold gaseous nitrogen stream 144 is sent to the heat exchanger 120 to recover some refrigeration and the resulting warmed stream 123 is preferably mixed with the warmed exhaust stream 121 and recycled back to an intermediate stage of the multi-stage compressor arrangement 102/104. Recycling of the warmed exhaust stream 121 and/or the warmed stream 123 may be to an intermediate stage of the multi-stage compressor arrangement 102/104 (shown in FIG. 5) or perhaps to a location upstream or downstream of the multi-stage compressor arrangement 102/104 will depend on the pressures of the warmed exhaust stream 121 and warmed stream 123.

The liquid nitrogen stream 142 extracted from the first phase separator 140 is valve expanded in expansion valve 145 and directed to a second phase separator 150 configured to produce a liquid nitrogen product stream 152 and a cold gaseous nitrogen stream 154 that may be warmed and recycled back to incoming stream 28 after some or all of its refrigeration is recovered in heat exchanger 120. A stream of cold nitrogen vapor 155 may further represent an additional integration point between the liquefier 100 and the cryogenic purification system 10. If the argon and hydrogen has been previously recovered in the cryogenic purification system 10, the liquid nitrogen product stream 152 and the gaseous nitrogen stream 154 will be purified. On the other hand, if the argon and/or hydrogen has not been previously recovered in the cryogenic purification system 10, the liquid nitrogen product stream 152 and the gaseous nitrogen stream 154 may contain measurable levels of argon and/or hydrogen which can and should be recovered within the liquefaction arrangement 100 or in a separate upstream or downstream recovery process.

With respect to the above-described integrated nitrogen liquefier arrangement 100, it is also possible to incorporate multiple stages of compression and/or use multiple compressors arranged in parallel for purposes of accommodating multiple return pressures of the recycled streams. In addition, the turbo-expanded refrigerant stream 109 may be directed to an intermediate location of the heat exchanger 120 (e.g. with respect to temperature) as the turbine discharge or exhaust does not have to be near saturation. The shaft work of expansion from turbine 135 and/or turbine 110 can be directed to various compressors in other process streams within the integrated cryogenic purification system 10 or, as shown with respect to turbine 110 may be used to "self-boost" the expansion stream. Alternatively, the shaft work of expansion from turbine 135 and/or turbine 110 may also be loaded to a generator.

INDUSTRIAL APPLICABILITY

As integrated with an ammonia synthesis process in an ammonia production plant, the present cryogenic purifier system and method takes a crude feed stream comprising hydrogen, nitrogen, methane and argon and produces the following product streams: (i) a hydrogen-nitrogen synthesis gas stream that may be recycled back to the ammonia plant synthesis section, and more particularly the ammonia synthesis gas stream upstream of the compressor or of the ammonia plant; (ii) a high methane content fuel gas that may be recycled back to the ammonia production plant and preferably to the steam reforming section of the ammonia plant, and more specifically to the furnace by which the primary reformer is fired; (iii) a liquid argon product stream; and (iv) a substantially pure nitrogen gaseous stream which may be recycled back to the ammonia plant, taken as a gaseous nitrogen product, or more preferably directed to a nitrogen recovery system, such as the liquefier as described above, to produce liquid and gaseous nitrogen products. The operating costs associated with the present integrated cryogenic purifier system and method are substantially lower that a Braun Purifier system or other conventional cryogenic purification systems.

While the present invention has been described with reference to one or more preferred embodiments and operating methods associated therewith, it should be understood that numerous additions, changes and omissions to the disclosed system and method can be made without departing from the spirit and scope of the present invention as set forth in the appended claims.

What is claimed is:

1. A cryogenic purification system configured for purifying a hydrogen, nitrogen, methane and argon containing feed stream, the system comprising:
   a synthesis gas rectification column configured to receive the feed stream and produce a hydrogen and nitrogen enriched overhead vapor stream and a methane-rich condensed phase stream at the bottom of the synthesis gas rectification column;
   a hydrogen stripping column configured to receive the methane-rich condensed phase stream from the synthesis gas rectification column, strip hydrogen from the methane-rich condensed phase stream and produce a hydrogen free methane bottom stream and a hydrogen enriched gaseous overhead;
   a condenser configured to receive the hydrogen free methane bottom stream and a working fluid and to vaporize the hydrogen free methane stream to produce a vaporized hydrogen free methane-rich stream or a partially vaporized hydrogen free methane-rich stream; and
   a heat exchanger configured to (a) warm the hydrogen and nitrogen enriched overhead vapor stream via indirect heat exchange with the feed stream to produce a hydrogen and nitrogen containing synthesis gas; and (b) to warm the vaporized hydrogen free methane-rich stream or the partially vaporized hydrogen free methane-rich stream via indirect heat exchange with the feed stream to produce a methane fuel gas.

2. The system of claim 1, further comprising a compressor disposed upstream of the synthesis gas rectification column and configured to compress the hydrogen, nitrogen, methane and argon containing feed stream to a pressure greater than about 300 psia.

3. The system of claim 1, further comprising an adsorption based pre-purifier disposed upstream of the synthesis gas rectification column and configured to remove selected contaminants from the hydrogen, nitrogen, methane and argon containing feed stream.

4. The system of claim 1, wherein the hydrogen to nitrogen ratio in the hydrogen and nitrogen containing synthesis gas is about 3:1.

5. The system of claim 1, further comprising:
   a second heat exchanger configured for cooling the methane-rich condensed phase stream; and
   an expansion valve disposed downstream of the second heat exchanger and upstream of the hydrogen stripping column and configured to expand the methane-rich stream to a pressure less than or equal to about 100 psia;
   wherein hydrogen is stripped from the expanded methane-rich stream within the hydrogen stripping column to produce the hydrogen free methane bottom stream and the hydrogen enriched gaseous overhead.

6. The system of claim 1, further comprising a recycle circuit configured to recycle the hydrogen rich gaseous overhead from the hydrogen stripping column back to the hydrogen, nitrogen, methane and argon containing feed stream.

7. The system of claim 6, further comprising a hydrogen compressor disposed within the recycle circuit upstream of the feed stream and configured to compress the hydrogen rich gaseous overhead stream to a pressure greater than or equal to the pressure of the hydrogen, nitrogen, methane and argon containing feed stream.

8. The system of claim 7, wherein the hydrogen enriched gaseous overhead from the hydrogen stripping column is warmed in the heat exchanger via indirect heat exchange with the hydrogen, nitrogen, methane and argon containing feed stream.

9. A cryogenic purification system configured for purifying a hydrogen, nitrogen, methane and argon containing feed stream, the system comprising:
   a synthesis gas rectification column configured to receive the feed stream and produce a hydrogen and nitrogen enriched overhead vapor stream and a methane-rich condensed phase stream at the bottom of the synthesis gas rectification column;
   a hydrogen stripping column configured to receive the methane-rich condensed phase stream from the synthesis gas rectification column, strip hydrogen from the methane-rich condensed phase stream and produce a hydrogen free methane bottom stream and a hydrogen enriched gaseous overhead;
   a condenser configured to receive the hydrogen free methane bottom stream and a working fluid and to vaporize the hydrogen free methane stream to produce a vaporized hydrogen free methane-rich stream or a partially vaporized hydrogen free methane-rich stream;
   a nitrogen rectification column configured to receive the vaporized hydrogen free methane-rich stream or the partially vaporized hydrogen free methane-rich stream and a nitrogen reflux stream and produce a nitrogen containing overhead vapor stream substantially free of methane and hydrogen, and a methane enriched liquid bottom stream;

a heat exchanger configured to (a) warm the nitrogen containing overhead vapor stream substantially free of methane and hydrogen via indirect heat exchange with the feed stream to produce a warm nitrogen stream, and (b) warm the methane enriched liquid bottom stream via indirect heat exchange with the feed stream to produce a methane fuel gas.

10. The system of claim 9, further comprising a nitrogen recovery system configured to receive the warm nitrogen stream and produce at least one nitrogen product.

11. The system of claim 10, wherein the nitrogen recovery system is a purification system configured to receive the warm nitrogen stream and produce the at least one nitrogen product, wherein the at least one nitrogen product is a purified gaseous nitrogen product.

12. The system of claim 10, wherein the nitrogen recovery system is a liquefier configured to receive the warm nitrogen stream and produce the at least one nitrogen product, wherein the at least one nitrogen product is a liquid nitrogen product.

13. The system of claim 12, further comprising an integration circuit disposed between the nitrogen recovery system and the nitrogen rectification column, and wherein a portion of the liquid nitrogen product is used as the nitrogen reflux stream for the nitrogen rectification column.

14. The system of claim 9, further comprising an argon rectification column configured to receive an argon enriched stream substantially free of methane from an intermediate location of the nitrogen rectification column and produce an argon bottoms liquid stream and a nitrogen enriched overhead stream; wherein the nitrogen enriched overhead stream is returned to the nitrogen rectification column; and wherein the argon bottoms liquid stream is extracted from the argon rectification column as a crude argon product stream.

15. A cryogenic purification system configured for purifying a hydrogen, nitrogen, methane and argon containing feed stream, the system comprising:
a synthesis gas rectification column configured to receive the hydrogen, nitrogen, methane and argon containing feed stream and produce a hydrogen and nitrogen enriched overhead vapor stream and a methane-rich condensed phase stream at the bottom of the synthesis gas rectification column;
a condenser-reboiler disposed within the synthesis gas rectification column configured to vaporize the hydrogen free methane bottom stream against a working fluid to produce a vaporized hydrogen free methane-rich stream or a partially vaporized hydrogen free methane-rich stream;
a nitrogen rectification column configured to receive the vaporized hydrogen free methane-rich stream or the partially vaporized hydrogen free methane-rich stream and a nitrogen reflux stream and produce a nitrogen containing overhead vapor stream substantially free of methane, and a methane enriched liquid bottom stream;
a heat exchanger configured to (a) warm the hydrogen and nitrogen enriched overhead vapor stream via indirect heat exchange with the hydrogen, nitrogen, methane and argon containing feed stream to produce a hydrogen and nitrogen containing synthesis gas; (b) warm the nitrogen containing overhead vapor stream substantially free of methane to produce a warm gaseous nitrogen stream, and (c) warm the methane enriched liquid bottom stream to produce a methane fuel gas; and
a nitrogen recovery system configured to receive the warm nitrogen containing stream and produce at least one nitrogen product.

16. The system of claim 15, further comprising a compressor disposed upstream of the synthesis gas rectification column and configured to compress the hydrogen, nitrogen, methane and argon containing feed stream to pressure greater than about 300 psia.

17. The system of claim 15, further comprising an adsorption based pre-purifier disposed upstream of the synthesis gas rectification column and configured to remove selected contaminants from the hydrogen, nitrogen, methane and argon containing feed stream feed to produce a conditioned feed stream.

18. The system of claim 15, wherein the hydrogen to nitrogen ratio in the hydrogen and nitrogen containing synthesis gas is about 3:1.

19. The system of claim 15, wherein the nitrogen rectification column operates at a pressure less than or equal to about 50 psia.

20. The system of claim 19, wherein the nitrogen rectification column operates at a pressure less than or equal to about 25 psia.

21. The system of claim 19, further comprising a pump or compressor configured to pressurize the methane enriched stream to a pressure greater than the pressure of the nitrogen rectification column or greater than the pressure of a fuel gas header associated with the cryogenic purification system.

22. The system of claim 15, wherein the warm gaseous nitrogen stream is free of hydrogen and the nitrogen recovery system is a purification system configured to receive the warm nitrogen stream and produce the at least one nitrogen product and wherein the at least one nitrogen product is a gaseous nitrogen product substantially free of hydrogen.

23. The system of claim 15, wherein the warm gaseous nitrogen stream is free of hydrogen and the nitrogen recovery system is a purification system configured to receive the warm nitrogen stream and produce the at least one nitrogen product and wherein the at least one nitrogen product is a purified gaseous nitrogen product.

24. The system of claim 15, wherein the nitrogen recovery system is a liquefier configured to receive the warm nitrogen stream and produce the at least one nitrogen product and wherein the at least one nitrogen product is a liquid nitrogen product.

25. The system of claim 24, further comprising an integration circuit disposed between the nitrogen recovery system and the nitrogen rectification column, and wherein a portion of the liquid nitrogen product is used as the reflux stream to the nitrogen rectification column.

26. The system of claim 15, further comprising a hydrogen stripping column configured to receive the methane-rich condensed phase stream from the synthesis gas rectification column, strip hydrogen from the methane-rich condensed phase stream and produce a hydrogen free methane bottom stream and a hydrogen enriched gaseous overhead.

27. The system of claim 26 further comprising:
a second heat exchanger disposed upstream of the hydrogen stripping column configured for cooling the methane-rich condensed phase stream; and
an expansion valve disposed downstream of the second heat exchanger and upstream of the hydrogen stripping column and configured to expand the methane-rich stream to a pressure less than or equal to about 100 psia.

28. The system of claim 26, further comprising a recycle circuit configured to recycle the hydrogen rich gaseous overhead from the hydrogen stripping column back to the hydrogen, nitrogen, methane and argon containing feed stream.

29. The system of claim 26, further comprising a hydrogen compressor disposed within the recycle circuit upstream of the hydrogen, nitrogen, methane and argon containing feed stream and configured to compress the hydrogen rich gaseous overhead stream to a pressure greater than or equal to the pressure of the hydrogen, nitrogen, methane and argon containing feed stream.

30. The system of claim 28, wherein the hydrogen rich gaseous overhead stream from the hydrogen stripping column is warmed in the heat exchanger via indirect heat exchange with the hydrogen, nitrogen, methane and argon containing feed stream.

31. The system of claim 15, further comprising an argon rectification column configured to receive an argon enriched stream substantially free of methane from an intermediate location of the nitrogen rectification column and produce an argon bottoms liquid stream and a nitrogen enriched overhead stream; wherein the nitrogen enriched overhead stream is returned to the nitrogen rectification column; and wherein the argon bottoms liquid stream is extracted from the argon rectification column as a crude argon product stream.

* * * * *